(12) United States Patent
Ohkado et al.

(10) Patent No.: US 9,121,934 B2
(45) Date of Patent: Sep. 1, 2015

(54) RADAR SYSTEM AND DETECTION METHOD

(75) Inventors: Makoto Ohkado, Nisshin (JP); Masaru Ogawa, Seto (JP); Isahiko Tanaka, Susono (JP); Koji Suzuki, Susono (JP); Atsushi Kawakubo, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 332 days.

(21) Appl. No.: 13/703,739

(22) PCT Filed: Jun. 7, 2011

(86) PCT No.: PCT/IB2011/001251
§ 371 (c)(1),
(2), (4) Date: Dec. 12, 2012

(87) PCT Pub. No.: WO2011/158081
PCT Pub. Date: Dec. 22, 2011

(65) Prior Publication Data
US 2013/0082868 A1  Apr. 4, 2013

(30) Foreign Application Priority Data
Jun. 16, 2010 (JP) ................. 2010-137206

(51) Int. Cl.
*G01S 13/93* (2006.01)
*G01S 13/08* (2006.01)
*G01S 7/41* (2006.01)
*G01S 13/34* (2006.01)

(52) U.S. Cl.
CPC ............... *G01S 13/08* (2013.01); *G01S 7/411* (2013.01); *G01S 13/345* (2013.01); *G01S 13/931* (2013.01); *G01S 2013/9375* (2013.01)

(58) Field of Classification Search
CPC ....... G01S 13/08; G01S 13/345; G01S 7/411; G01S 13/931; G01S 2013/9375
USPC ............................................... 342/70–72, 123
See application file for complete search history.

(56) References Cited

U.S. PATENT DOCUMENTS 6,429,804 B1    8/2002 Kishida et al.
6,819,285 B1 *  11/2004 Stockman et al. ............. 342/123

(Continued)

FOREIGN PATENT DOCUMENTS

DE        19801617 A1 *  7/1999
DE   102010012662 A1 *  1/2011

(Continued)

OTHER PUBLICATIONS

International Search Report Issued Oct. 14, 2011 in PCT/IB11/01251 Filed Jun. 7, 2011.

*Primary Examiner* — John B Sotomayor
(74) *Attorney, Agent, or Firm* — Oblon, McClelland, Maier & Neustadt, L.L.P.

(57) ABSTRACT

A radar system includes an arithmetic processing unit, which calculates the second derivative of the intensity of a reflected wave and determines whether a target is an upper structure or a vehicle, based on the second derivative. Alternatively, the arithmetic processing unit decomposes the waveform of the intensity of the reflected wave into frequency components and determines whether the target is an upper structure or a vehicle, based on the intensity of a predetermined frequency component.

12 Claims, 12 Drawing Sheets

(56) References Cited

U.S. PATENT DOCUMENTS

| | | | |
|---|---|---|---|
| 9,002,630 B2* | 4/2015 | Suzuki | 701/300 |
| 2003/0146867 A1 | 8/2003 | Kornle et al. | |
| 2008/0111733 A1* | 5/2008 | Spyropulos et al. | 342/189 |
| 2008/0169966 A1 | 7/2008 | Tsuchihashi et al. | |
| 2011/0181407 A1* | 7/2011 | Kole | 340/435 |
| 2012/0229328 A1 | 9/2012 | Aizawa | |

FOREIGN PATENT DOCUMENTS

| | | |
|---|---|---|
| EP | 1 923 717 | 5/2008 |
| JP | 2004 239744 | 8/2004 |
| JP | 2006 98220 | 4/2006 |
| JP | 2008 122391 | 5/2008 |
| WO | 2011 064823 | 6/2011 |
| WO | 2011 158292 | 12/2011 |

* cited by examiner

RADAR SYSTEM AND DETECTION METHOD

BACKGROUND OF THE INVENTION

1. Field of the Invention

The invention relates to a radar system that is mounted on a vehicle, or the like and detects an obstacle and/or a preceding vehicle ahead and to a detection method.

2. Description of Related Art

A vehicle has already been available, on which a radar system is mounted to detect obstacles and/or preceding vehicles ahead of the vehicle and determine the relative distance to the obstacles and/or the preceding vehicles.

The radar system is mounted in a front portion of the vehicle and a transmitting antenna of the radar system outputs a transmitted wave ahead of the vehicle. When the transmitted wave hits the obstacles, the preceding vehicles, etc. and is reflected therefrom, the reflected wave is received by a receiving antenna of the radar system. The reflection source, such as the preceding vehicles and the obstacles, is herein collectively referred to as the target.

After the reflected wave is received by the receiving antenna, an arithmetic processing unit in the radar system calculates the relative distance between the vehicle and the target based on the time lag (delay time) between the transmitted wave and the reflected wave. In addition, the arithmetic processing unit is connected to the warning device and when, based on the result of calculation of the relative distance, it is determined that the target can approach the vehicle and collide with the vehicle, the arithmetic processing unit sends a warning command to the warning device. The warning device that has received the warning command sounds the alarm or displays a warning message to prompt the driver to decelerate the vehicle and/or avoid the obstacles and/or the preceding vehicles.

For the purpose of sending a warning command, the arithmetic processing unit determines the height of the target. When the height of the target is low and the vehicle can easily run over the target, the vehicle would not collide with the target and therefore, there is no need to send the warning command to the warning device. Thus, when a target is detected, the height of the target is determined and it is determined whether it is necessary to send a warning command.

As a method of determining the height of the target, a method that utilizes the intensity (amplitude) of the reflected wave has already been available. It is known that the intensity of the reflected wave varies depending on the relative distance between the vehicle and the target and that the trend of the variation depends on the height of the target. Japanese Patent Application Publication No. 2008-122391 (JP-A-2008-122391) describes that a curve of the intensity of the reflected wave in relation to the relative distance between a radar system and a target is obtained through experiments or the like, the curve is obtained for each height of the target, and the curves for the respective heights are stored in a memory of the radar system. The curve of the intensity of the reflected wave that is detected by the radar system while the vehicle is driven and the plurality of curves for the respective heights that are stored in the memory are compared with each other (subjected to the pattern matching), the curve that is minimum in the difference from the curve of the reflected wave that is detected by the radar system is extracted from among the curves for the respective heights stored in the memory, and the height of the target corresponding to the extracted curve is assumed to be the height of the target that is detected by the radar system.

For the purpose of improving safety, it is desirable that the target be detected as early as possible, that is, while the target is still distant from the vehicle. This is accomplished by increasing the detectable range of the radar system by increasing the power of the oscillator that generates the transmitted wave. By increasing the power of the oscillator, it becomes possible to increase the detectable range that has been approximately 50 m, to approximately 150 m.

Meanwhile, because of the propagation characteristics of the transmitted wave, the detectable range of the radar system is increased not only in the travel direction but also in the horizontal direction and the vertical direction. As a result, the transmitted wave is reflected by the upper structures, such as the road signs and overpasses, that were not reached by the transmitted wave. Because there is no fear that the upper structures hit the vehicle, it should be avoided that a warning command is sent in response to detection of the upper structures. For this reason, after the target is detected, it is necessary to determine the height of the target to determine whether the target is an upper structure or a preceding vehicle, and to determine whether it is required to send a warning command.

Figure 12:
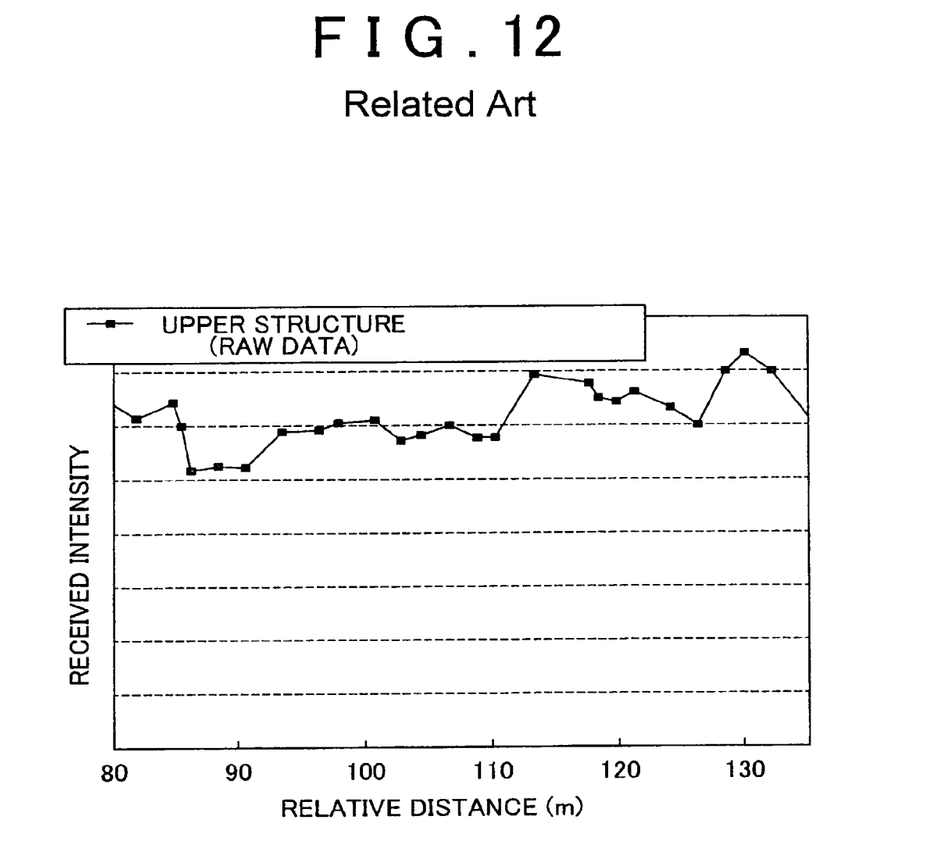
FIG. 12 is a diagram showing a waveform of a reflected wave from an upper structure when a conventional radar system is used.
Figure 13:
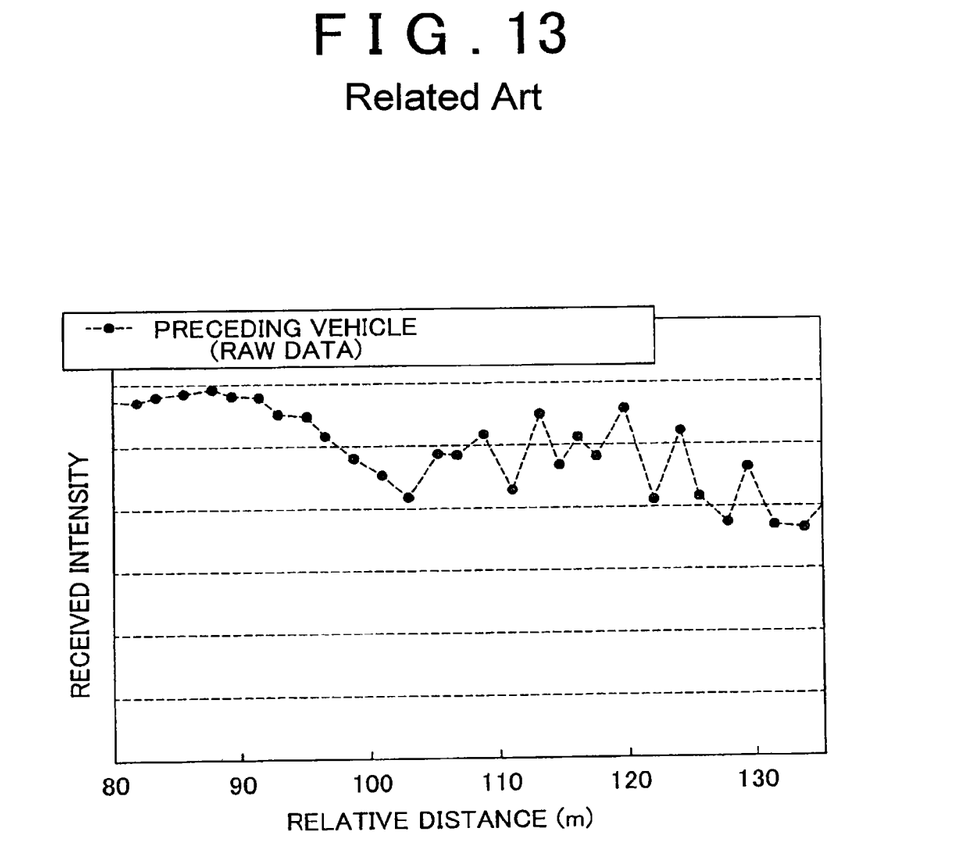
FIG. 13 is a diagram showing a waveform of a reflected wave from a preceding vehicle when a conventional radar system is used.

When the detectable range is increased, however, the reflected wave that is received by the receiving antenna contains much noise and as a result, although the height of a preceding vehicle and the height of an upper structure differ from each other, the difference between the intensities of the reflected waves therefrom becomes unclear. The waveform of the intensity of the reflected wave from an upper structure and the waveform of the intensity of the reflected wave from a preceding vehicle when a conventional radar system is used are shown in FIG. 12 and FIG. 13, respectively. As apparent from these diagrams, there was no clear difference between an upper structure and a preceding vehicle in the case of the conventional technology and it has been difficult to determine whether the target is a preceding vehicle or an upper structure, based on the intensity of the reflected wave.

SUMMARY OF THE INVENTION

The invention provides a means that makes it possible to discriminate between an upper structure and a preceding vehicle.

A first aspect of the invention is a radar system including: an oscillator that oscillates to generate a transmitted wave; a transmitting antenna that outputs the transmitted wave; a receiving antenna that receives a reflected wave from a target; an angle detector that reduces noise of the reflected wave based on an angle of incidence of the reflected wave on the receiving antenna; and an arithmetic processing unit that calculates an intensity of the reflected wave, in which the noise has been reduced, and determines a relative distance to the target, wherein the arithmetic processing unit performs a predetermined process based on a second derivative of the intensity associated with the relative distance.

A second aspect of the invention is a radar system including: an oscillator that oscillates to generate a transmitted wave; a transmitting antenna that outputs the transmitted wave; a receiving antenna that receives a reflected wave from a target; an angle detector that reduces noise of the reflected wave based on an angle of incidence of the reflected wave on the receiving antenna; and an arithmetic processing unit that calculates an intensity of the reflected wave, in which the noise has been reduced, and determines a relative distance to the target, wherein the arithmetic processing unit performs a predetermined process based on the intensity of, of frequency components of the intensity associated with the relative distance, at least one of the frequency components within a predetermined band.

In the above first and second aspects of the invention, the arithmetic processing unit may determine a height of the target as the predetermined process.

In the above first and second aspects of the invention, the arithmetic processing unit may determine an attribute of the target based on the height of the target as the predetermined process.

In the above first and second aspects of the invention, the angle detector may determine an angle of incidence of the reflected wave incident on the receiving antenna and reduce noise of the reflected wave by excluding the reflected wave, the angle of incidence of which is out of a predetermined horizontal incident angle range.

A third aspect of the invention is a detection method including: outputting a transmitted wave; receiving, from a target, a reflected wave of the transmitted wave; reducing noise of the reflected wave based on an angle of incidence of the reflected wave; calculating an intensity of the reflected wave, in which the noise has been reduced; determining a relative distance to the target; and performing a predetermined process based on a second derivative of the intensity associated with the relative distance.

A fourth aspect of the invention is a detection method including: outputting a transmitted wave; receiving, from a target, a reflected wave of the transmitted wave; reducing noise of the reflected wave based on an angle of incidence of the reflected wave; calculating an intensity of the reflected wave, in which the noise has been reduced; determining a relative distance to the target; and performing a predetermined process based on the intensity of, of frequency components of the intensity associated with the relative distance, at least one of the frequency components within a predetermined band.

In the above third and fourth aspects of the invention, the performing the predetermined process may include determining a height of the target.

In the above third and fourth aspects of the invention, the performing the predetermined process may further include determining an attribute of the target based on the height of the target.

In the above third and fourth aspect of the invention, the reducing the noise may include excluding the reflected wave, the angle of incidence of which is out of a predetermined horizontal incident angle range.

As a result of plotting the intensity of the reflected wave from an upper structure and the intensity of the reflected wave from a preceding vehicle versus relative distance and taking the second derivative of each of the intensities, the present inventors have found that a significant difference therebetween appears and these can be discriminated. Thus, in this invention, the attribute of the target (whether the target is a vehicle or an upper structure) is determined based on the second derivative of the intensity of the reflected wave. In this way, the invention makes it possible to discriminate between a vehicle and an upper structure that have been difficult to discriminate by conventional methods.

In addition, as a result of plotting the intensity of the reflected wave from an upper structure and the intensity of the reflected wave from a preceding vehicle versus relative distance and comparing the waveforms of these intensities with respect to the frequency components thereof, the present inventors have found that a significant difference therebetween appears and these can be discriminated. Thus, in this invention, the attribute of the target is determined based on the intensity of a frequency component within a predetermined band. In this way, the invention makes it possible to discriminate between a vehicle and an upper structure that have been difficult to discriminate by conventional methods.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
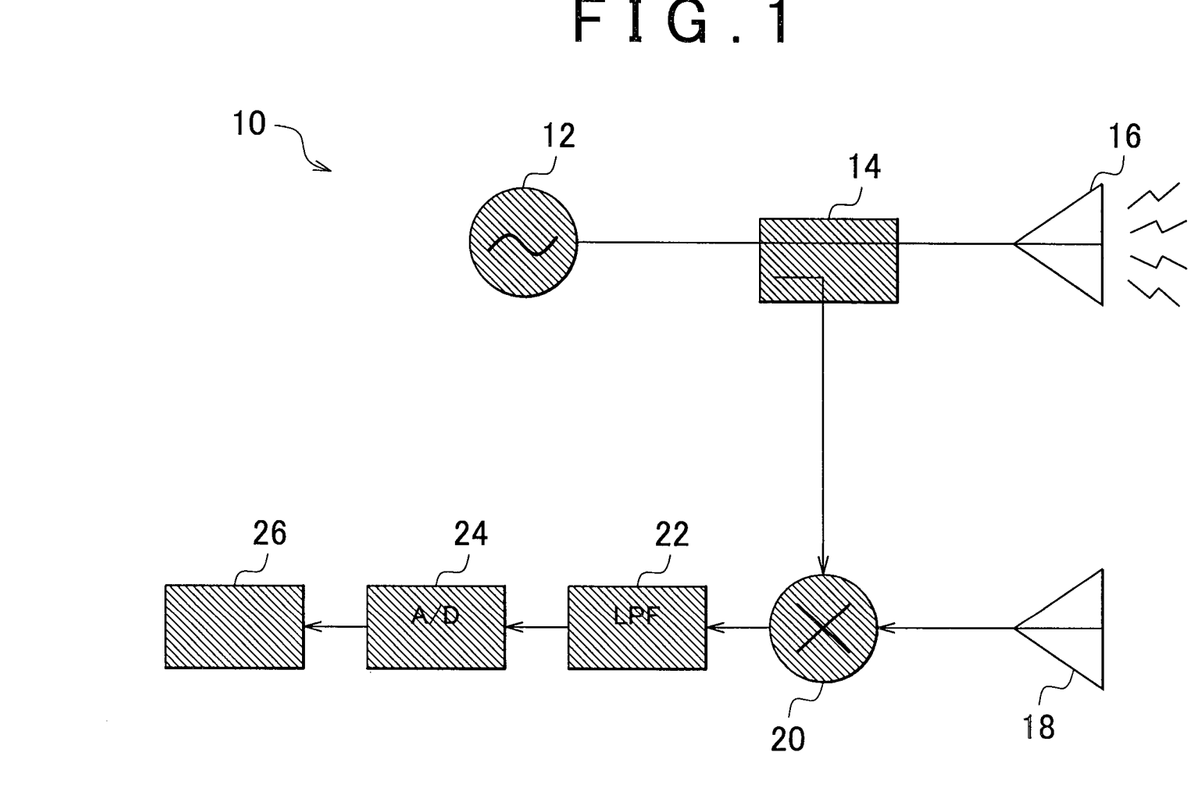
FIG. 1 is a diagram showing an on-board radar system according to an embodiment.

A configuration of a radar system according to an embodiment will be described with reference to FIG. 1. The radar system 10 is mounted in a front portion of a vehicle (not shown). The radar system 10 is a frequency-modulated continuous waves (FM-CW) radar and includes a variable frequency oscillator 12 to output a frequency-modulated (FM) wave. The oscillator 12 is connected to a transmitting antenna 16 via a distributor 14. The radar system 10 includes a receiving antenna 18, which is connected to a mixer 20. The mixer 20 is also connected to the above-described distributor 14 and is further connected to a filter circuit 22 having a low-pass filter. The filter circuit 22 is connected to an analogue-to-digital (A/D) converter 24, which is connected to an arithmetic processing unit 26.

Figure 2:
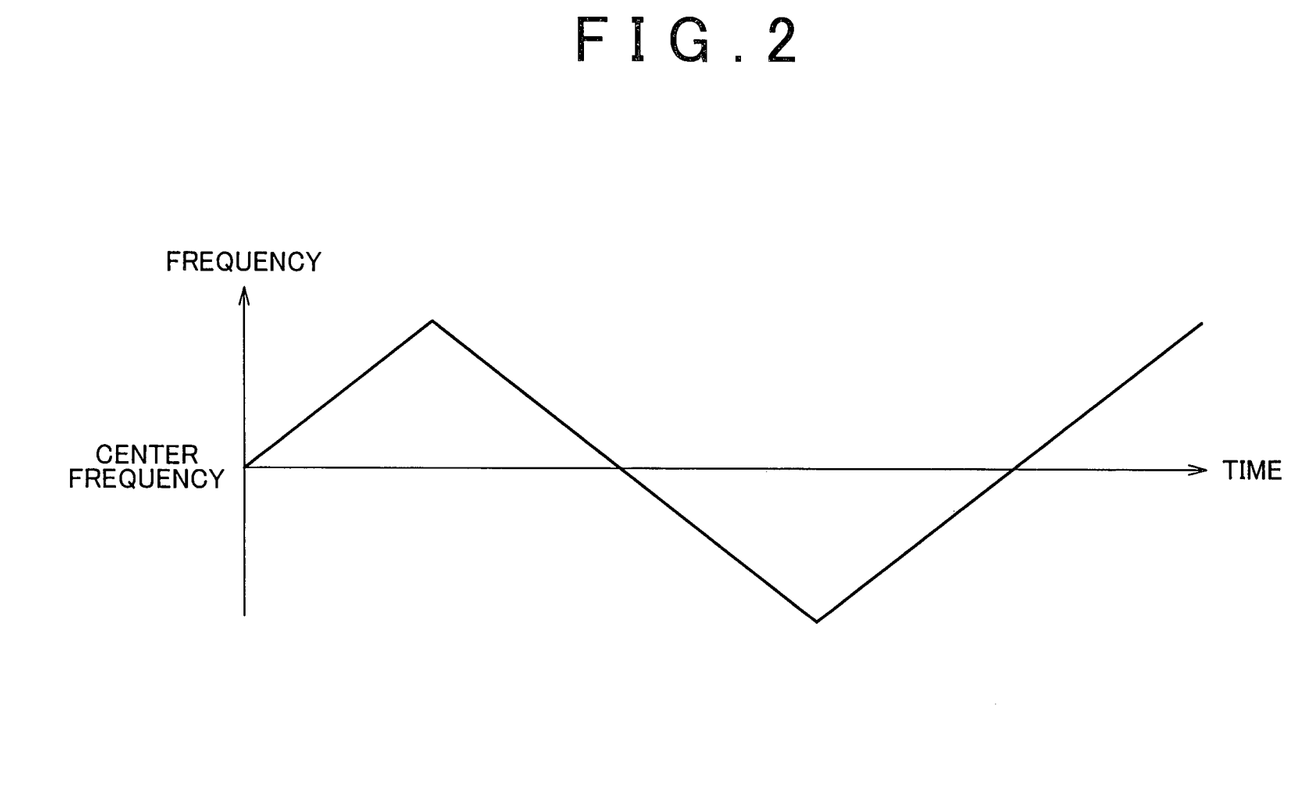
FIG. 2 is a diagram showing a waveform of a transmitted wave.

Next, operations of respective components of the radar system 10 will be described. The oscillator 12 modulates oscillation frequency to generate a transmitted wave, which is an FM wave. Specifically, the oscillator 12 modulates the transmitted wave so that the waveform of the transmitted wave becomes a triangular wave as shown in FIG. 2.

The transmitting antenna 16 outputs the transmitted wave generated by the oscillator 12. In this embodiment, in order to avoid the reflection from targets that are significantly off the travel direction of the vehicle, the angular range of the output of the transmitted wave from the transmitting antenna 16 is narrowed to a predetermined angle range. In this embodiment, the output angular range of the transmitted wave is set to 7.0° to 7.5° in either of the horizontal direction and the vertical direction. With this configuration, when this angular setting is employed, the transmitted wave spreads to a height of approximately 9 m plus the height, at which the radar system 10 is installed, in the vertical direction at a point 150 meters distant from the vehicle, on which the radar system 10 is mounted. In the horizontal direction, the transmitted wave spreads to the width of 18 m.

In the meantime, laws and regulations require that the height of upper structures, such as overpasses and signs, that are installed over roads should be equal to or higher than 5.0 m. Because of the output angular range, when the relative distance between the vehicle and the upper structure becomes equal to or greater than approximately 80 m, the transmitted wave is reflected by the upper structure.

Figure 3:
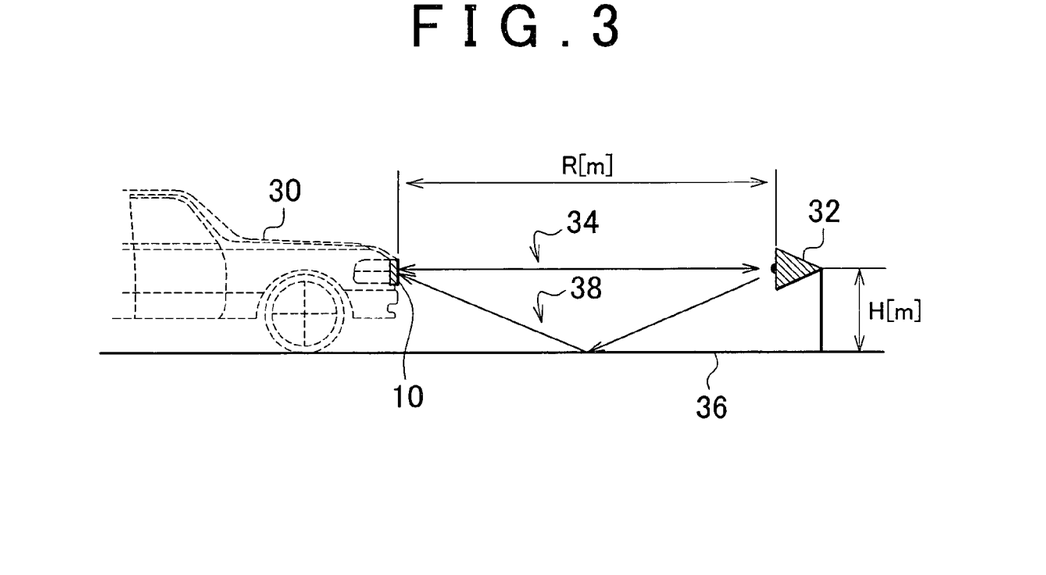
FIG. 3 is a diagram showing a direct reflected wave and an indirect reflected wave.

When the transmitted wave hits the target 32, such as the preceding vehicle and/or the, upper structure ahead of the vehicle 30, the reflected wave thereof is received by the receiving antenna 18. As shown in FIG. 3, the reflected wave is classified into a direct reflected wave 34 that directly travels from the target 32 to the receiving antenna 18 and an indirect reflected wave 38 that travels from the target 32 to the receiving antenna 18 after being once reflected from a road surface 36. The receiving antenna 18 receives, as the reflected wave, a composite wave of the direct reflected wave 34 and the indirect reflected wave 38. Because the direct reflected wave 34 and the indirect reflected wave 38 differ from each other in the path length from the target 32 to the receiving antenna 18, the direct reflected wave 34 and the indirect reflected wave 38 interfere with each other and the intensity (amplitude) I of the reflected wave resulting from the composition of both of the waves varies depending on the level of interference. The level of interference varies depending on the path length from the target 32 to the receiving antenna 18. Specifically, the intensity I of the reflected wave varies depending on the height, h, of the target 32 and the relative distance between the receiving antenna 18 and the target 32.

Figure 4:
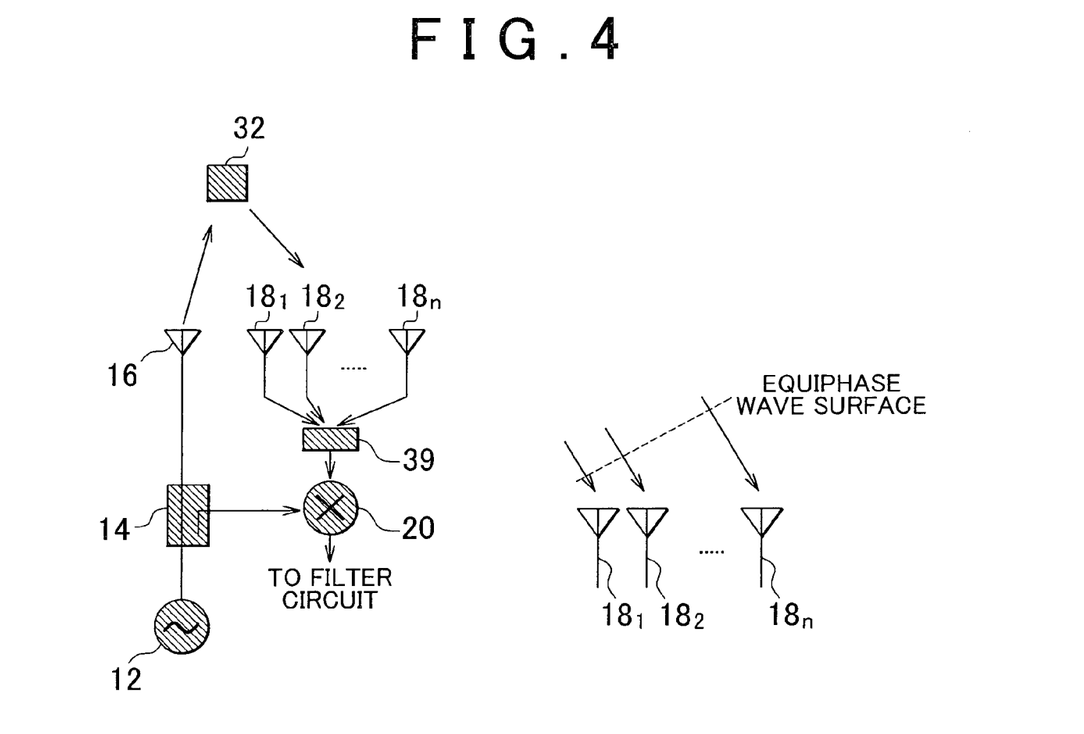
FIG. 4 is a diagram showing a means for narrowing the angle of incidence of the reflected wave.

In addition to the direct reflected wave 34 and the indirect reflected wave 38, signals from, for example, roadside units for measuring the volume of traffic that are provided on roads, the reflected wave from, for example, guard rails present in the transverse direction with respect to the travel direction, etc. can be received by the receiving antenna 18. Thus, in order to exclude the signals other than the direct reflected wave 34 and the indirect reflected wave 38, regarding such signals as noise, the receiving antenna 18 may include an incident angle limiting means for limiting the angle of incidence of the signals incident on the receiving antenna 18. Specifically, as shown in FIG. 4, a plurality of receiving antennas $18_1$ to $18_n$, are arranged in the horizontal direction and an angle detector 39 is provided that is connected to the receiving antennas $18_1$ to $18_n$ and receives signals therefrom. The angle detector 39 calculates the angle of incidence of the received signals incident on the receiving antennas $18_1$ to $18_n$ by performing calculation by the multiple signal classification (MUSIC) algorithm or by the estimation of signal parameters via rotational invariance techniques (ESPRIT) algorithm. In this embodiment, the condition concerning the angle of incidence that determines the horizontal incident angle range of the reflected wave incident on the receiving antennas $18_1$ to $18_n$ (by which, for example, the horizontal incident angle is limited to within ±5° when the angle parallel to the travel direction of the vehicle is zero) is stored in a memory (not shown) of the angle detector 39. When the angle detector 39 receives the signals from the receiving antennas $18_1$ to $18_n$, the angle detector 39 compares the incident angle condition and the angle of incidence of the received signal incident on the receiving antennas $18_1$ to $18_n$. When the angle of incidence is greater than the angle set in the incident angle condition, the angle detector 39 discards the received signal. On the other hand, when the angle of incidence satisfies the incident angle condition, the angle detector 39 transmits the received signal to the mixer 20.

Figure 5:
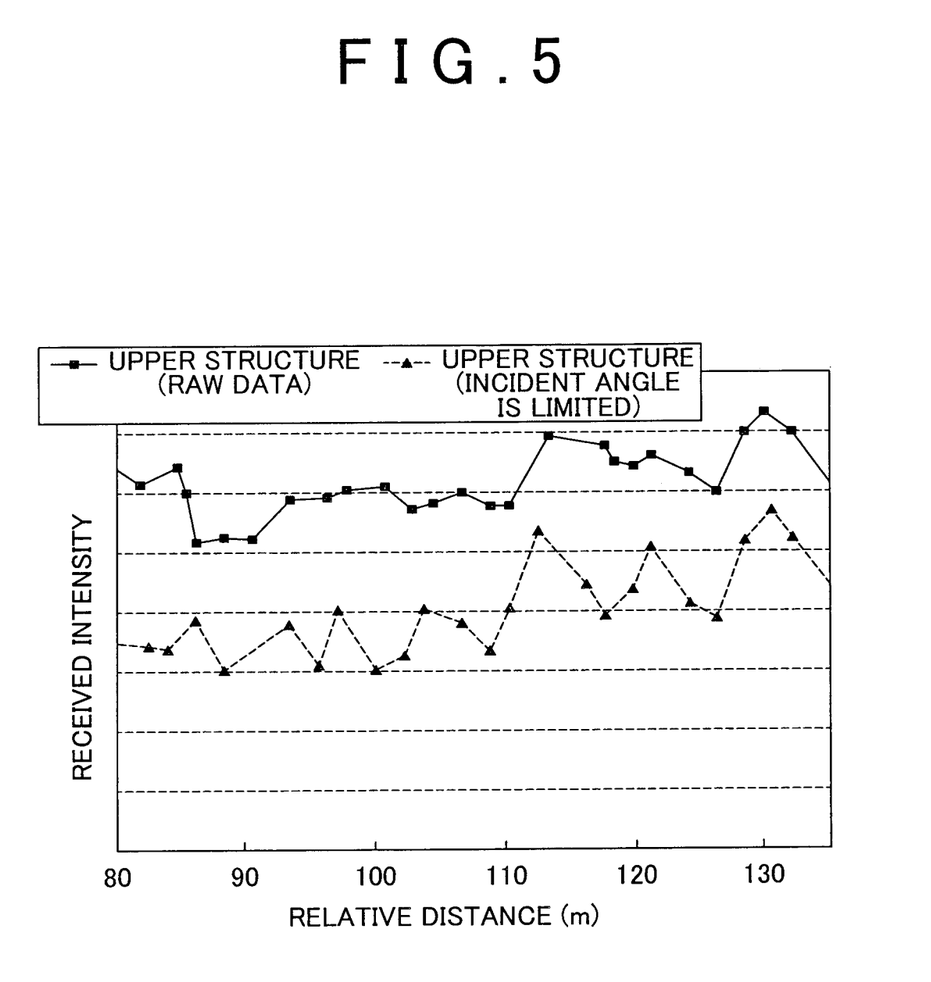
FIG. 5 is a diagram showing a waveform of the reflected wave from an upper structure.
Figure 6:
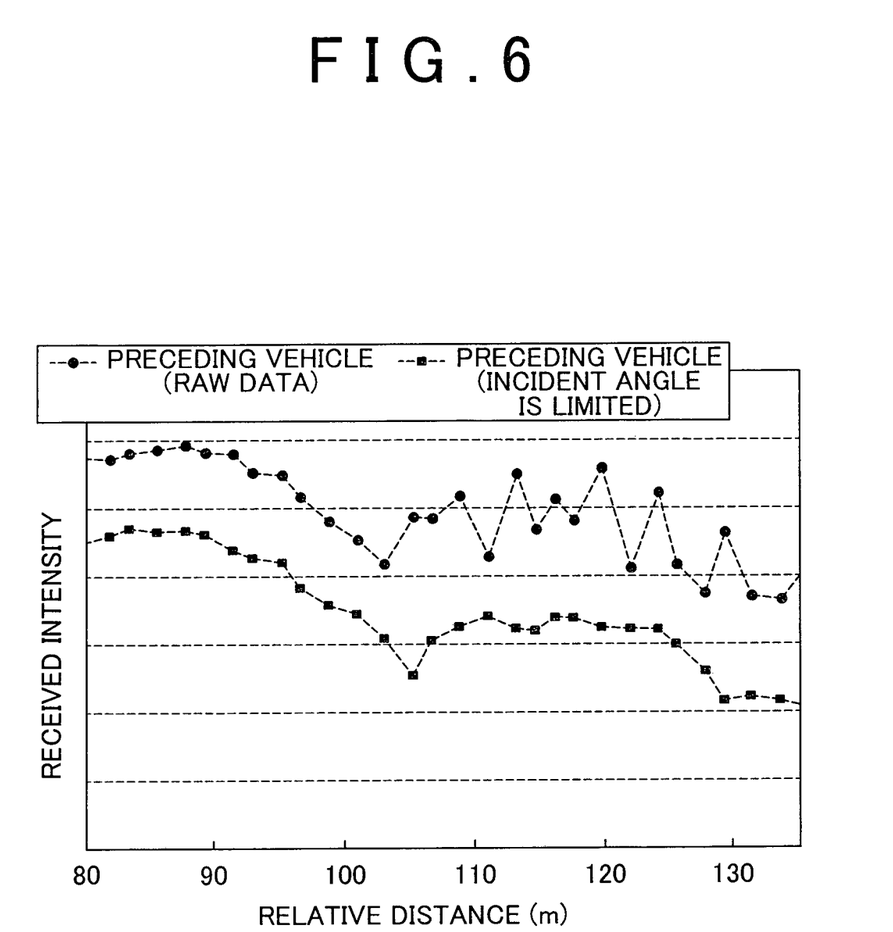
FIG. 6 is a diagram showing a waveform of the reflected wave from a preceding vehicle.

FIG. 5 shows a graph of the intensity of the reflected wave from an upper structure. FIG. 6 shows a graph of the intensity of the reflected wave from a preceding vehicle. In both of these figures, the solid line indicates the intensity of the reflected wave, in which noise is not reduced (the angle of incidence is not limited), and the broken line indicates the intensity of the reflected wave, in which noise has been reduced (only the reflected wave, the angle of incidence of which satisfies the condition concerning the angle of incidence).

Referring back to FIG. 1, the reflected wave received by the receiving antenna 18 is transmitted to the mixer 20. The mixer 20 is also connected to the distributor 14, and the transmitted wave output from the oscillator 12 is sent to the mixer 20 via the distributor 14.

In the mixer 20, a beat signal obtained by mixing the transmitted wave 40 and the reflected wave 42 is generated. The beat signal is a signal of the beat that is caused by the difference in frequency between the transmitted wave 40 and the reflected wave 42, which is caused by the delay time (time lag) of the reflected wave 42 with respect to the transmitted wave 40. The beat signal is passed through the filter circuit 22 and is converted into a digital signal via the A/D converter 24, and is then transmitted to the arithmetic processing unit 26. The arithmetic processing unit 26 calculates the relative distance R between the target 32 and the vehicle 30 based on the beat signal.

Figure 7:
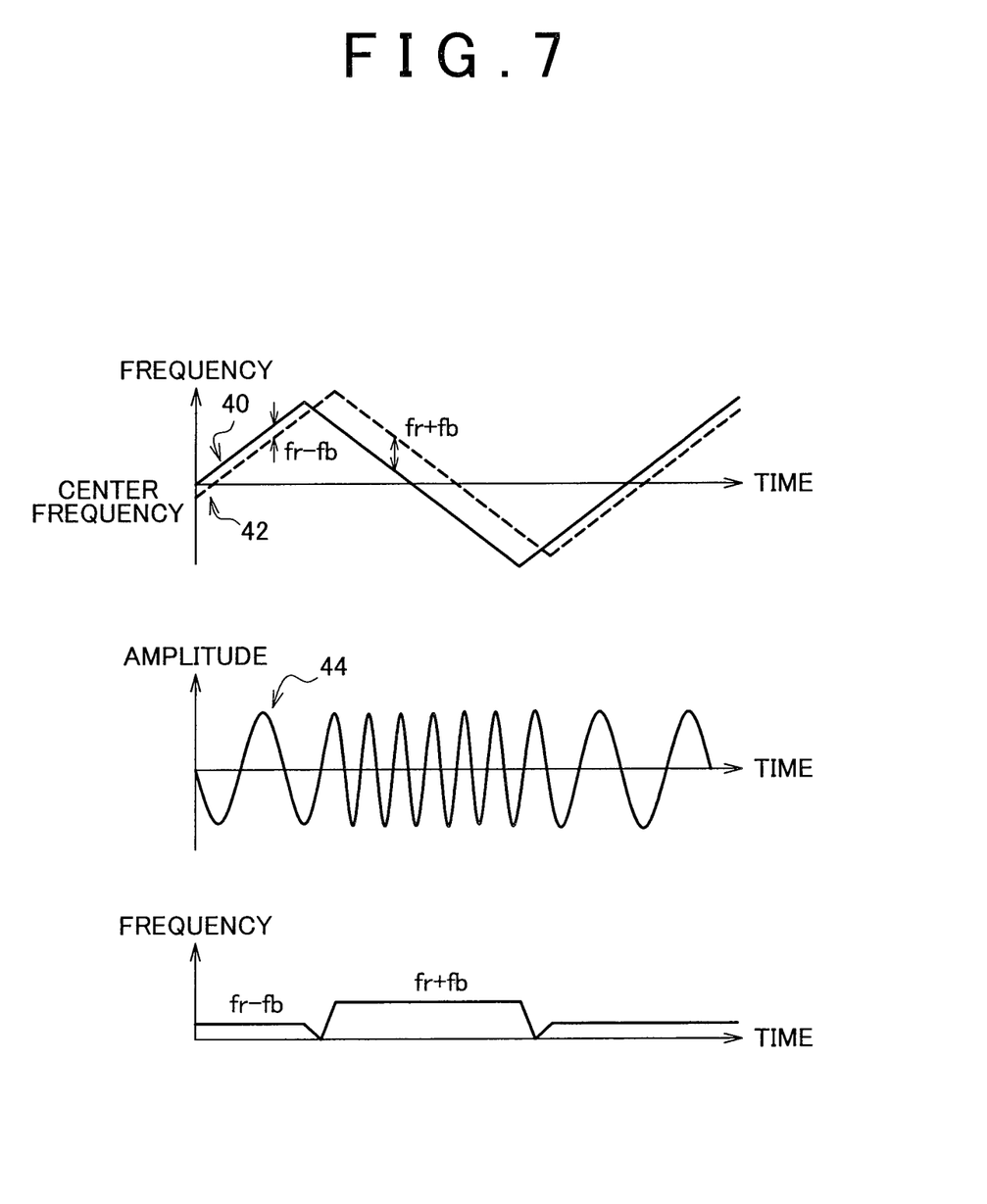
FIG. 7 shows diagrams for explaining a method of determining a relative distance between the radar system and a target.

A method of determining the relative distance R between the vehicle 30 and the target 32 based on the beat signal will be described below. Because the vehicle 30 is running, due to the influence of the Doppler effect, the reflected wave 42 is offset in the vertical axis (frequency) direction relative to the transmitted wave 40 as shown in the upper diagram of FIG. 7. When the beat frequency is $f_r$ and the Doppler frequency is $f_b$, the amount of offset changes between $f_r+f_b$ and $f_r-f_b$ every half cycle. Thus, as shown in the middle and lower diagrams of FIG. 7, the frequency of the beat signal 44 that is obtained by mixing the transmitted wave 40 and the reflected wave 42 also changes between $f_r+f_b$ and $f_r-f_b$ every half cycle. With the use of this phenomenon, the beat signal 44 is converted to the frequency domain by the fast Fourier transform (FFT), for example, to obtain the value of $f_r+f_b$ and the value of $f_r-f_b$, whereby it is made possible to obtain the beat frequency $f_r$.

Figure 8:
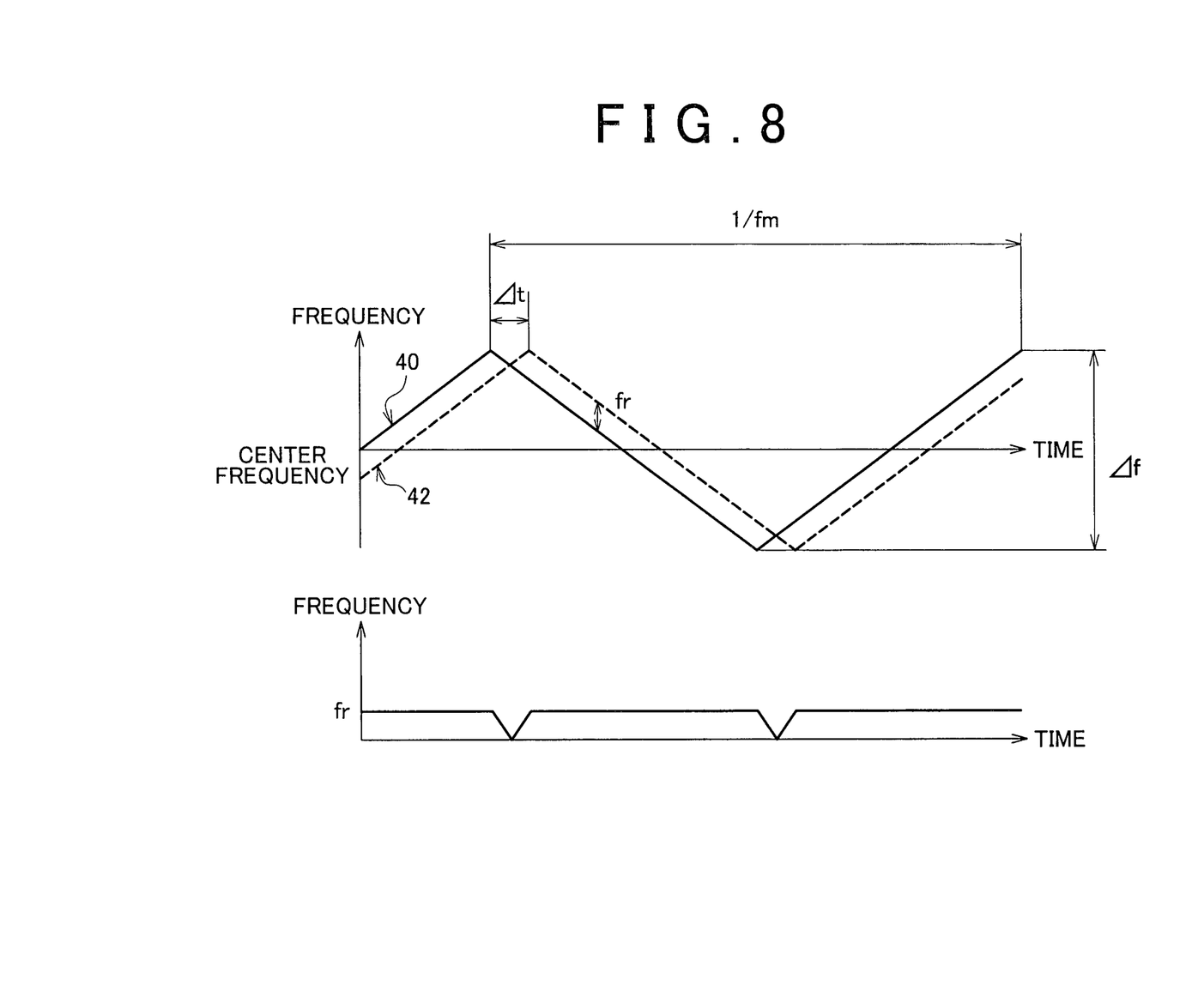
FIG. 8 shows diagrams for explaining the method of determining the relative distance between the radar system and the target.

The waveforms of the transmitted wave 40 and the reflected wave 42 when the influence of the Doppler effect is eliminated are shown in the upper diagram of FIG. 8. The variation of the frequency of the beat signal 44 in this case is shown in the lower diagram of FIG. 8. As shown in the upper diagram of FIG. 8, there is a delay time Δt between the transmitted wave 40 and the reflected wave 42. When the propagation velocity of the transmitted wave 40 and the reflected wave 42 is c, which is the speed of light, $3\times10^8$ m/s, for example, the relative distance (radial distance) R between the vehicle 30 and the target 32 is expressed by the following Equation (1).

$$R = \frac{c\Delta t}{2}. \quad (1)$$

In addition, when the modulation repetition period (given) of the transmitted wave 40 is $1/f_m$ and the modulation frequency range (given) is $\Delta f$, the following Equation (2) is derived from the geometrical relations in the upper diagram of FIG. 8.

$$\Delta t = \frac{f_r}{2 f_m \cdot \Delta f} \quad (2)$$

The following Equation (3) is derived from the Equations (1) and (2).

$$R = \frac{c \cdot f_r}{4 f_m \cdot \Delta f} \quad (3)$$

The arithmetic processing unit 26 determines the relative distance R between the vehicle 30 and the target 32 by performing the above-described calculations.

The arithmetic processing unit 26 determines the relative distance R between the vehicle 30 and the target 32 and at the same time, obtains the signal intensity (amplitude) I of the reflected wave 42. The obtained intensity I is stored in the memory (not shown) in association with the relative distance R.

As described above, when the detectable range is enlarged, the transmitted wave hits the upper structure. Thus, as a result of sampling the intensity I of the reflected wave from a preceding vehicle and the intensity I of the reflected wave from an upper structure in an area such that the transmitted wave hits the upper structure, plotting these intensities I in association with the relative distance R, and analyzing the waveforms thereof, the present inventors have found that it is possible to determine whether the target 32, which is the reflection source, is an upper structure or a preceding vehicle by taking the second derivative of the intensity I of the reflected wave.

Figure 9:
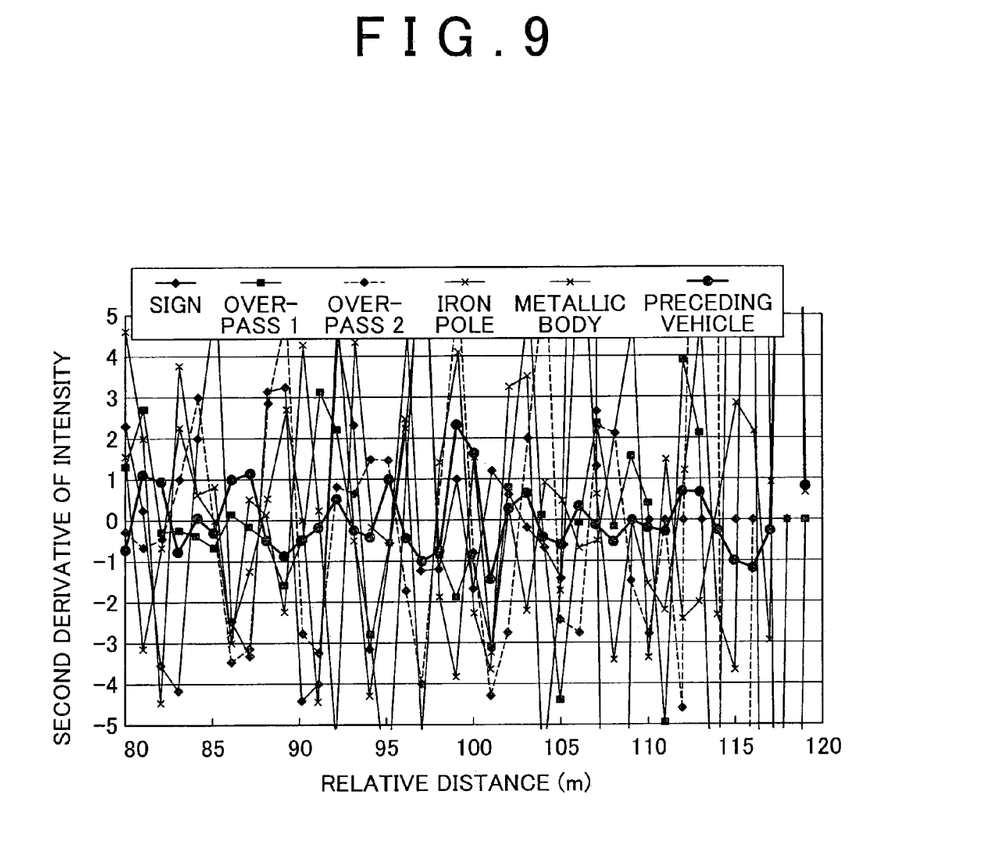
FIG. 9 is a diagram showing a result of taking a second derivative of the intensity of the reflected wave.

FIG. 9 shows results obtained by selecting four objects, that is, a sign, an overpass, an iron pole, and another metallic body, as the upper structures, sampling the intensities I of the reflected waves in association with the relative distances R therefrom, sampling the intensity I of the reflected wave from a preceding vehicle, and taking the second derivative of the intensities I of the reflected waves. These upper structures are installed at substantially the same height. The reflected wave, in which noise has been reduced by the angle detector 39, is the subject, the second derivative of which is taken.

In FIG. 9, the preceding vehicle is represented by a thick line and the upper structures are represented by thin lines. The vertical axis indicates the second derivative of the intensity I and the horizontal axis indicates the relative distance R between the vehicle and the upper structure or the preceding vehicle. As described above, when the relative distance R between the vehicle 30 and the target 32 becomes equal to or greater than 80 m, the reflected wave from the upper structure becomes incident on the receiving antenna 18. The lower limit of the range of the relative distance R (hereinafter referred to as the detection range), in which range the intensity I is sampled, is set to 80 m, and in consideration of the maximum detectable range of 150 m, the upper limit of the detection range is set to 140 m that is nearer than 150 m.

As shown in FIG. 9, it can be seen that the waveform of the preceding vehicle is less in variation in the level of intensity than those of the upper structures. It can be said that because all of these upper structures are installed at substantially the same height, the targets 32 are classified according to the height by taking the second derivative of the intensity I. By classifying the targets 32 according to the height thereof, it becomes possible to discriminate between the preceding vehicle and the upper structure.

When the number of markers (coordinate points), at which the value of the vertical axis (value of the second derivative of the intensity) is equal to or greater than 2, was counted for each of the upper structures and the preceding vehicle, a distinct difference between the preceding vehicle and the upper structures appeared. The results of counting are shown in the following Table 1.

TABLE 1

|  | Sign | Overpass 1 | Overpass 2 | Iron pole | Metallic body | Preceding vehicle |
| --- | --- | --- | --- | --- | --- | --- |
| Number of markers, at which second derivative is equal to or greater than 2 | 16 | 18 | 22 | 23 | 23 | 2 |

As shown in Table 1, it can be seen that the number of markers in the case of the preceding vehicle is significantly less than those in the case of the upper structures. With the use of the results, by setting a threshold value of the second derivative of the intensity I of the reflected wave (the threshold value is two, for example), and counting the number of markers, at which the second derivative of the intensity I of the reflected wave received by the receiving antenna 18 is greater than the threshold value, it is possible to determine that the target 32 is an upper structure when the number of makers is greater than a predetermined number (the predetermined number is five, for example).

Figure 10:
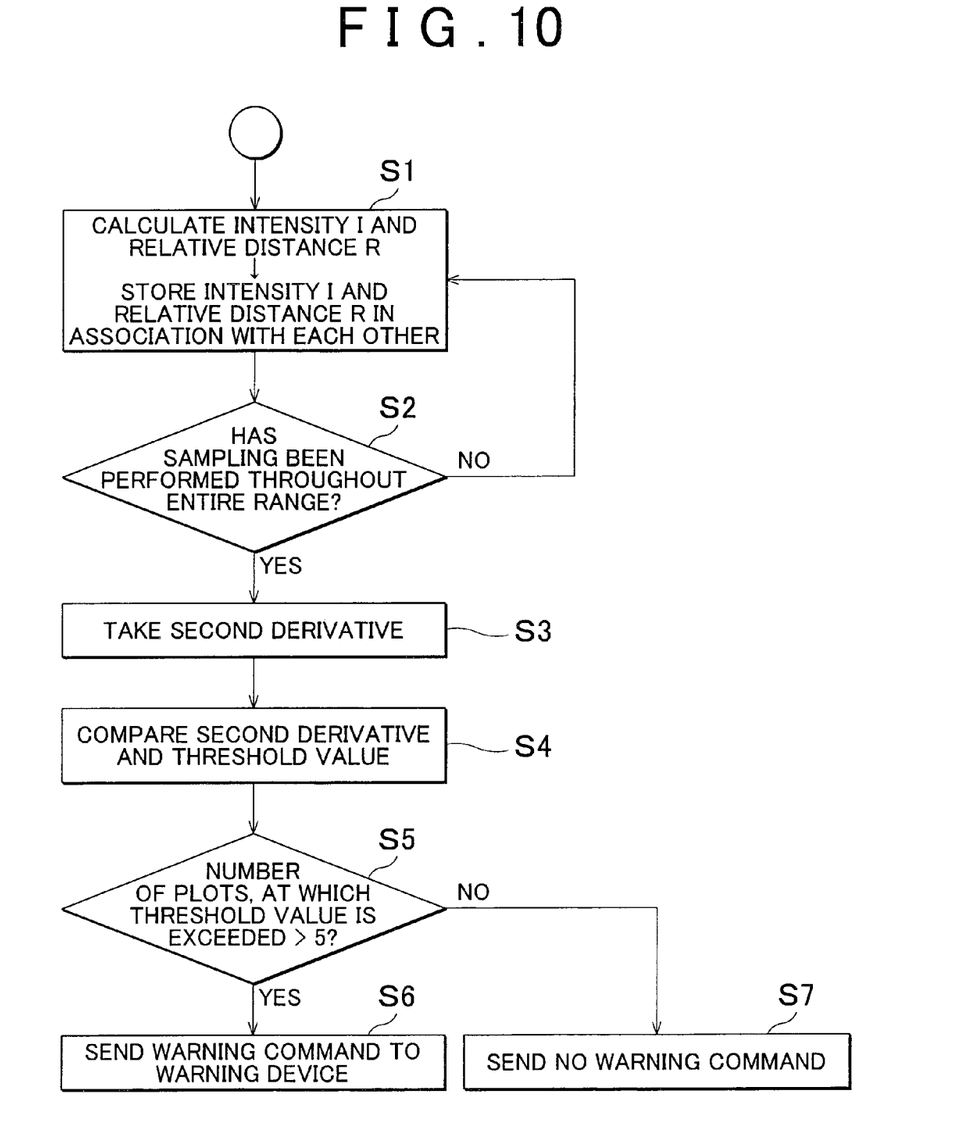
FIG. 10 is a diagram showing a flow chart to determine whether it is necessary to send a warning command.

A flow chart of determination made by the arithmetic processing unit 26 based on the above knowledge is shown in FIG. 10. The arithmetic processing unit 26 calculates the relative distance R between the target 32 and the radar system 10 with regard to the reflected wave received through the receiving antennas 18 and the angle detector 39 and when the relative distance R is in the predetermined detection range, the arithmetic processing unit 26 determines the intensity I of the reflected wave and stores the intensity in a memory (not shown) in association with the relative distance R (S1). The associating process is performed throughout the entire detection range (S2). Next, the second derivative of the intensity I of the reflected wave that has been stored is taken (S3). Next, by comparing the second derivative and the predetermined threshold value, the number of markers, at which the second derivative is equal to or greater than the threshold value, is counted (S4). Next, the number of markers counted and the predetermined determination reference (five, for example) are compared with each other (S5) and when the determination reference is not exceeded, it is determined that the target 32 is a preceding vehicle and a warning command is sent to a warning device (S6). On the other hand, when the determination reference is exceeded, it is determined that the target 32 is an upper structure, and no warning command is sent to the warning device (S7). As described above, in this embodiment, the second derivative of the intensity of the reflected wave is taken, whereby it is made possible to discriminate between a preceding vehicle and an upper structure, which have been difficult to discriminate by conventional methods. Note that in addition to or instead of sending the warning command to the warning device in S6, a decelerating command and/or a command to increase the tension of the seat belt may be sent to the control unit that controls the vehicle.

The present inventors have also found that it is possible to discriminate between a preceding vehicle and an upper structure by decomposing the intensity I of the reflected wave into frequency components and analyzing the intensity I of each of the frequency components, instead of employing the above embodiment.

Figure 11:
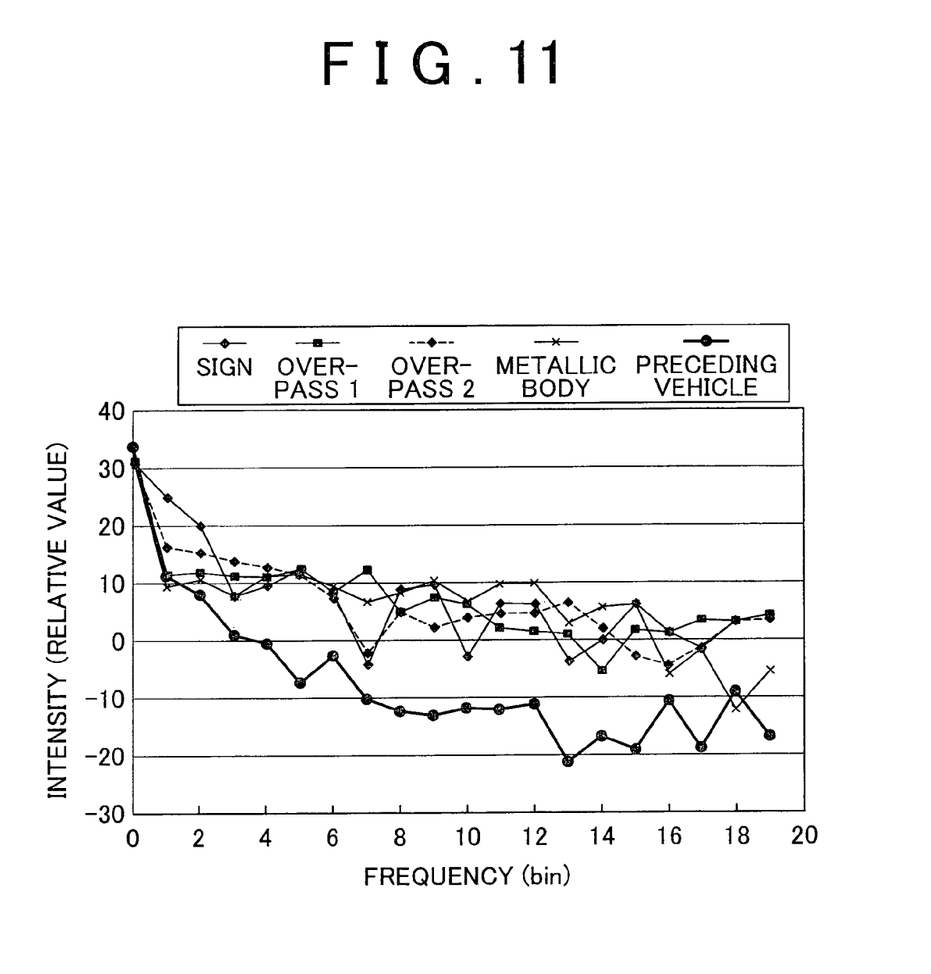
FIG. 11 is a diagram showing results of decomposing the waveforms of the intensities of the reflected waves into frequency components.

FIG. 11 shows results obtained by selecting four objects, that is, a sign, overpasses, and another metallic body, as the upper structures, sampling the intensities I of the reflected waves therefrom, sampling the intensity I of the reflected wave from a preceding vehicle, and performing the fast Fourier transform (FFT) of the intensities I of the reflected waves. The preceding vehicle is represented by a thick line and the upper structures are represented by thin lines. The vertical axis indicates the relative value of the intensity of each frequency component and the horizontal axis indicates "bin" representing the frequency spectrum. As in the case shown in FIG. 9, the reflected wave, in which noise has been reduced by the angle detector 39, is the subject of the FFT. The detection range with respect to the relative distance R is limited to the range between 80 m and 140 m.

As shown in FIG. 11, it can be seen that the markers corresponding to the preceding vehicle are evidently separated from the group of the upper structures. This means that it is possible to classify the targets 32 according to the height by decomposing the intensity I into frequency components. By classifying the targets 32 according to the height, it is possible to discriminate between a preceding vehicle and an upper structure.

When the average value of the intensity (vertical axis) in the case of the upper structures and that in the Case of the preceding vehicle were calculated in the region, in which the frequency spectrum (horizontal axis) is equal to or greater than 8 bin, a significant difference therebetween appeared. The results of calculation are shown in the following Table 2.

TABLE 2

| | Sign | Overpass 1 | Overpass 2 | Metallic body | Preceding vehicle |
|---|---|---|---|---|---|
| Average value of intensities of frequency components equal to or higher than 8 bin | 3.26 | 2.68 | 2.37 | 2.92 | −14.4 |

As shown in Table 2, it can be seen that the average value of the intensity in the case of the preceding vehicle is significantly smaller than the average value thereof in the case of the upper structure. With the use of this result, by calculating the average value of the intensities I of the frequency components of the reflected wave within a predetermined frequency band, it is possible to determine that the target 32 is a preceding vehicle when the average value is smaller than a predetermined value (zero, for example).

A flow chart of determination made by the arithmetic processing unit 26 based on the above knowledge is the flow chart shown in FIG. 10, in which S3, S4, and S5 are replaced by the following steps, S3', S4', and S5'. Specifically, the arithmetic processing unit 26 performs the FFT of the intensity I of the reflected wave within the detection range (R=80 m to 150 m) (S3'). Next, the frequency components equal to or greater than 8 bin with respect to the frequency spectrum are extracted and the average value of the intensities I within the predetermined frequency band is calculated (S4'). Next, the average value and a reference value (zero, for example) stored in a memory (not shown) in advance are compared with each other (S5') and when the average value is equal to or lower than the reference value, it is determined that the target 32 is a preceding vehicle and a warning command is sent to the warning device (S6). On the other hand, when the average value exceeds the reference value, it is determined that the target 32, which is the reflection source, is an upper structure, and no warning command is sent to the warning device (S7).

As described above, this embodiment makes it possible to discriminate between a preceding vehicle and an upper structure, which have been difficult to discriminate by conventional methods. Thus, it is possible to avoid erroneously sending a warning command when an upper structure is detected.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

The invention claimed is:

1. A radar system for a vehicle, which is for determining a height of a target, comprising:
    an oscillator that is configured to oscillate to generate a transmitted wave;
    a transmitting antenna that is configured to output the transmitted wave;
    a receiving antenna that is configured to receive a reflected wave from a target;
    an angle detector that is configured to reduce noise of the reflected wave based on an angle of incidence of the reflected wave on the receiving antenna; and
    an arithmetic processing unit that is configured to calculate an intensity of the reflected wave, in which the noise has been reduced, and to determine a relative distance to the target,
    wherein the arithmetic processing unit is configured to take a second derivative of each intensity associated with the relative distance, and to determine the height of the target in accordance with a number of the second derivatives of the intensities that are greater than a predetermined threshold value.

2. The radar system according to claim 1, wherein the arithmetic processing unit is configured to determine an attribute of the target based on the determined height of the target.

3. The radar system according to claim 1, wherein the angle detector is configured to determine an angle of incidence of the reflected wave incident on the receiving antenna, and to reduce noise of the reflected wave by excluding the reflected wave, the angle of incidence of which is out of a predetermined horizontal incident angle range.

4. A radar system for a vehicle, which is for determining a height of a target, comprising:
    an oscillator that is configured to oscillate to generate a transmitted wave;
    a transmitting antenna that is configured to output the transmitted wave;

a receiving antenna that is configured to receive a reflected wave from a target;

an angle detector that is configured to reduce noise of the reflected wave based on an angle of incidence of the reflected wave on the receiving antenna; and an arithmetic processing unit that is configured to calculate an intensity of the reflected wave, in which the noise has been reduced, and to determine a relative distance to the target, wherein the arithmetic processing unit is configured to decompose each intensity associated with the relative distance into frequency components, and to determine the height of the target in accordance with an average value of the intensities of the frequency components within a predetermined frequency band.

5. The radar system according to claim 4, wherein the arithmetic processing unit, is configured to determine an attribute of the target based on the determined height of the target.

6. The radar system according to claim 4, wherein the angle detector is configured to determine an angle of incidence of the reflected wave incident on the receiving antenna, and to reduce noise of the reflected wave by excluding the reflected wave, the angle of incidence of which is out of a predetermined horizontal incident angle range.

7. A detection method for a vehicle, which is for determining a height of a target, comprising:

outputting a transmitted wave;

receiving, from a target, a reflected wave of the transmitted wave;

reducing noise of the reflected wave based on an angle of incidence of the reflected wave;

calculating, with a processor, an intensity of the reflected wave, in which the noise has been reduced;

determining, with the processor, a relative distance to the target;

taking, with the processor, a second derivative of each intensity associated with the relative distance; and determining, with the processor, the height of the target in accordance with a number of the second derivatives of the intensities that are greater than a predetermined threshold value.

8. The detection method according to claim 7, further comprising:

determining an attribute of the target based on the determined height of the target.

9. The detection method according to claim 7, wherein the reducing the noise includes excluding the reflected wave, the angle of incidence of which is out of a predetermined horizontal incident angle range.

10. A detection method for a vehicle, which is for determining a height of a target, comprising:

outputting a transmitted wave;

receiving, from a target, a reflected wave of the transmitted wave;

reducing noise of the reflected wave based on an angle of incidence of the reflected wave;

calculating, with a processor, an intensity of the reflected wave, in which the noise has been reduced;

determining, with the processor, a relative distance to the target;

decomposing, with the processor, each intensity associated with the relative distance into frequency components; and determining, with the processor, the height of the target in accordance with an average value of the intensities of the frequency components within a predetermined frequency band.

11. The detection method according to claim 10, wherein further comprising determining an attribute of the target based on the determined height of the target.

12. The detection method according to claim 10, wherein the reducing the noise includes excluding the reflected wave, the angle of incidence of which is out of predetermined horizontal incident angle range.

* * * * *